(12) United States Patent
Boyer et al.

(10) Patent No.: US 7,320,140 B1
(45) Date of Patent: Jan. 15, 2008

(54) MODIFYING DIGITAL RIGHTS

(75) Inventors: Jason Boyer, Waltham, MA (US); Lawrence MacLennan, Londonderry, NH (US); Robert Mathews, Jamaica Plain, MA (US)

(73) Assignee: Adobe Systems Incorporated, San Jose, CA (US)

( * ) Notice: Subject to any disclaimer, the term of this patent is extended or adjusted under 35 U.S.C. 154(b) by 730 days.

(21) Appl. No.: 10/463,837

(22) Filed: Jun. 16, 2003

(51) Int. Cl.
G06F 15/16 (2006.01)
G06F 17/30 (2006.01)
G06F 7/04 (2006.01)
G06F 7/58 (2006.01)
G06K 19/00 (2006.01)
G06K 9/00 (2006.01)
H04L 9/32 (2006.01)

(52) U.S. Cl. .............................. 726/6; 726/21; 713/189

(58) Field of Classification Search ................ 726/2–4, 726/6, 21
See application file for complete search history.

(56) References Cited

U.S. PATENT DOCUMENTS

| 6,938,021 B2 * | 8/2005 | Shear et al. ................... 705/67 |
| 7,058,606 B2 * | 6/2006 | Stefik et al. ................... 705/51 |
| 2003/0167236 A1 * | 9/2003 | Stefik et al. ................... 705/51 |

OTHER PUBLICATIONS

EBX Technical Committee Meeting, Apr. 11-12, 2000, InterTrust Technologies, Santa Clara, California (13 pages).
EBX Technical Committee Meeting, May 8-9, 2000, Glassbook, Inc., Waltham, Massachusetts (10 pages).
EBX Technical Committee Meeting Jun. 6-7, 2000, Intel Corporation, Santa Clara, California (11 pages).
EBX Technical Committee Meeting, Jul. 11-12, 2000, SoftLock. Com, Maynard, Massachusetts (16 pages).
EBX Technical Committee Meeting, Sep. 20-21, 2000, R.R. Donnelley, New York, New York (15 pages).
EBX Technical Committee Meeting, Oct. 31-Nov. 1, 2000, R.R. Donnelley, New York, New York (11 pages).
EBX Technical Committee Meeting, Dec. 6-7, 2000, Renaissance Denver Hotel, Denver, Colorado (11 pages).

* cited by examiner

Primary Examiner—Gilberto Barron, Jr.
Assistant Examiner—Samson Lemma
(74) Attorney, Agent, or Firm—Fish & Richardson P.C.

(57) ABSTRACT

Methods and apparatus, including computer program products, for defining rights applicable to a digital object. A set of initial rights and a set of modifying rights are received for the digital object. At least one of the set of initial rights and the set of modifying rights specifies one or more conditions on rights in the respective set of rights. A new set of rights is defined for the digital object based on the set of initial rights and the set of modifying rights. The new set of rights specifies one or more new conditions on rights in the new set of rights. The new conditions are defined based on one or more of the conditions in the set of initial rights and/or the set of modifying rights.

36 Claims, 8 Drawing Sheets

MODIFYING DIGITAL RIGHTS

BACKGROUND

The present invention relates to digital rights management.

A digital object is a collection of digital data. Data in a digital object can represent content, such as text, video, music, computer instructions and other work, that is subject to limited use or distribution, e.g., protected legally by intellectual property ("IP") rights, such as copyright. For example, an electronic representation of a book (i.e., an e-book), a moving picture, or a sound record has typically content protected by copyright. Alternatively, a content owner may wish to protect content in a digital object without pursuing legal protection.

When digital objects are distributed, e.g., sold or lent to consumers, content can be protected by a digital rights management ("DRM") system. A DRM system defines and enforces digital rights. A digital right is a permission to perform one or more actions that involve a digital object including protected content. By managing digital rights, the DRM system allows content owners, on one hand, to prevent unauthorized use or distribution of the protected content and, on the other hand, to selectively authorize users to perform actions that involve the protected content.

In a typical DRM system, a digital object with protected content is associated with a set of digital rights, where each digital right specifies one or more actions that can be authorized using the right. For example, a digital document can be associated with a set of digital rights including a print right and a display right that can be used to authorize printing and displaying, respectively. Optionally, the set of digital rights can specify conditions on one or more rights in the set. A condition on a right specifies restrictions for performing an action specified by the right. For example, conditions on the print right can specify a limited time period, a portion of the content, or a maximum number of pages for printing the document. Digital rights and corresponding conditions can be expressed using, e.g., rights languages such as eXtensible rights Markup Language ("XrML") or Open Digital Rights Language ("ODRL").

For authorizing an action that involves the digital object, the DRM system can include a DRM engine. The DRM engine processes digital rights and provides authorization for actions involving protected content based on the digital rights. For example upon request, the DRM engine can evaluate a set of digital rights associated with a digital object, and based on the evaluation, provide or deny authorization for an action involving the digital object.

Traditionally, in order to minimize unauthorized manipulation of digital rights, once a set of digital rights is associated with a digital object, the associated set of digital rights can be modified only by an owner of the protected content. For example, if a consumer buys a digital object with a set of initial rights and later requests additional rights, the content owner provides a new set of digital rights that includes both the initial rights and the additional rights.

SUMMARY

The invention provides techniques for modifying a set of initial rights based on a set of modifying rights. In general, in one aspect, the invention provides methods and apparatus, including computer program products, implementing techniques for defining rights applicable to a digital object. A set of initial rights for the digital object and a set of modifying rights for the digital object are received. At least one of the set of initial rights and the set of modifying rights specifies one or more conditions on rights in the respective set of rights. A new set of rights is defined for the digital object based on the set of initial rights and the set of modifying rights The new set of rights specifies one or more new conditions on rights in the new set of rights. The new conditions are defined based on one or more of the conditions in the set of initial rights and/or the set of modifying rights.

Particular implementations can include one or more of the following features. Defining a new set of rights for the digital object can include defining the new set of rights to be equally restrictive as or more restrictive than the set of initial rights. The new set of rights can include each right that is included both in the set of initial rights and the set of modifying rights. The new set of rights can include all rights in the set of initial rights. Each of the new conditions specified by the new set of rights can be defined to be equally restrictive as or more restrictive than the one or more conditions on which the new condition is based.

Defining a new set of rights for the digital object can include defining the new set of rights to be equally restrictive as or less restrictive than the set of initial rights. The new set of rights can include all rights in the set of initial rights and the set of modifying rights. Each of the new conditions specified by the new set of rights can be defined to be equally restrictive as or less restrictive than the one or more conditions on which the new condition is based.

Receiving a set of initial rights and a set of modifying rights can include receiving a common right that is included in the set of initial rights and in the set of modifying rights. The new set of rights can be defined to include the common right. The set of modifying rights can specify one or more modifying conditions on the common right. The new set of rights can specify one or more new conditions on the common right. The new conditions on the common right can be based on the modifying conditions on the common right. The set of initial rights can specify one or more initial conditions on the common right. The new conditions on the common right can be based on the initial conditions on the common right. Defining a new set of rights can include identifying a pair of conditions including one of the initial conditions on the common right and one of the modifying conditions on the common right. A new condition can be defined on the common right based on the identified pair of conditions. A condition in the identified pair of conditions can include one or more condition parameters, and defining a new condition on the common right can include defining a new condition parameter based on the one or more condition parameters in the identified pair using a combining rule. Receiving a set of initial rights can include receiving a right to modify one or more initial rights. Conflicts can be resolved between the new conditions specified by the new set of rights.

In general, in another aspect, the invention provides methods and apparatus, including computer program products, implementing techniques for defining conditions on a right applicable to a digital object. A child right for the digital object and a parent right for the digital object are selected in a hierarchy of rights including a plurality of levels. The child right is below the parent right in the hierarchy. The hierarchy of rights specifies one or more conditions on the child right and the parent right. A set of new conditions is defined on the child right. The set of new conditions includes one or more conditions that are defined based on one or more of the conditions on the child and parent rights using condition specific combining rules.

Particular implementations can include one or more of the following features. One or more ancestor rights for the digital object can be selected in the hierarchy of rights, where the one or more ancestor rights are above the child right and the parent right in the hierarchy. The hierarchy can specify one or more conditions on each of the one or more ancestor rights. For each of the one or more ancestor rights, one or more of the conditions defined on the child right are recursively modified based on one or more conditions on the ancestor rights.

In general, in another aspect, the invention provides methods and apparatus, including computer program products, implementing techniques for distributing digital rights. A set of initial rights and a set of modifying rights are specified for the digital object. At least one of the set of initial rights and the set of modifying rights specifies one or more conditions on rights in the respective set of rights. The set of modifying rights can be used to define a new set of rights for the digital object based on the set of initial rights, wherein the new set of rights specifies one or more new conditions on rights in the new set of rights. The new conditions are defined based on one or more of the conditions in the set of initial rights and/or the set of modifying rights. The set of initial rights and the set of modifying rights are distributed separately.

In general, in another aspect, the invention provides methods and apparatus, including computer program products, implementing techniques for distributing digital rights. A set of initial rights is received for the digital object. A set of modifying rights is specified for the digital object. At least one of the set of initial rights and the set of modifying rights specifies one or more conditions on rights in the respective set of rights. A new set of rights is defined for the digital object based on the set of initial rights and the set of modifying rights. The new set of rights specifies one or more new conditions on rights in the new set of rights. The new conditions are defined based on one or more of the conditions in the set of initial rights and/or the set of modifying rights. The new set of rights for the digital object is distributed.

Particular implementations can include one or more of the following features. The set of initial rights and the set of modifying rights can be specified by a publisher of the digital object. The set of initial rights can be specified by a publisher of the digital object, and the set of modifying rights can be specified by a distributor.

The invention can be implemented to realize one or more of the following advantages. A set of initial rights can be modified without requesting an entirely new set of rights. A retailer, a distributor, or a library can narrow initial rights for a digital object without consulting the content owner each time a different narrowing is required. Due to the narrowing, the narrowed set of rights will not be broader in any respect than the set of initial rights. By modifying a set of initial rights, e.g., for an e-book, an electronic library can impose lending restrictions on the e-book. A consumer can broaden a set of initial rights, e.g., by buying broadening rights for a digital object. When a consumer broadens the initial rights, the broadened set of rights will not be narrower in any respect than the set of initial rights. The consumer can buy broadening rights from competing retailers and independently from a publisher of the initial rights. Restrictions for authorizing an action can be derived by combining conditions on rights in a hierarchy of rights. In the hierarchy, conditions on a single right can modify restrictions for authorizing multiple actions that are specified by rights below the single right in the hierarchy.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
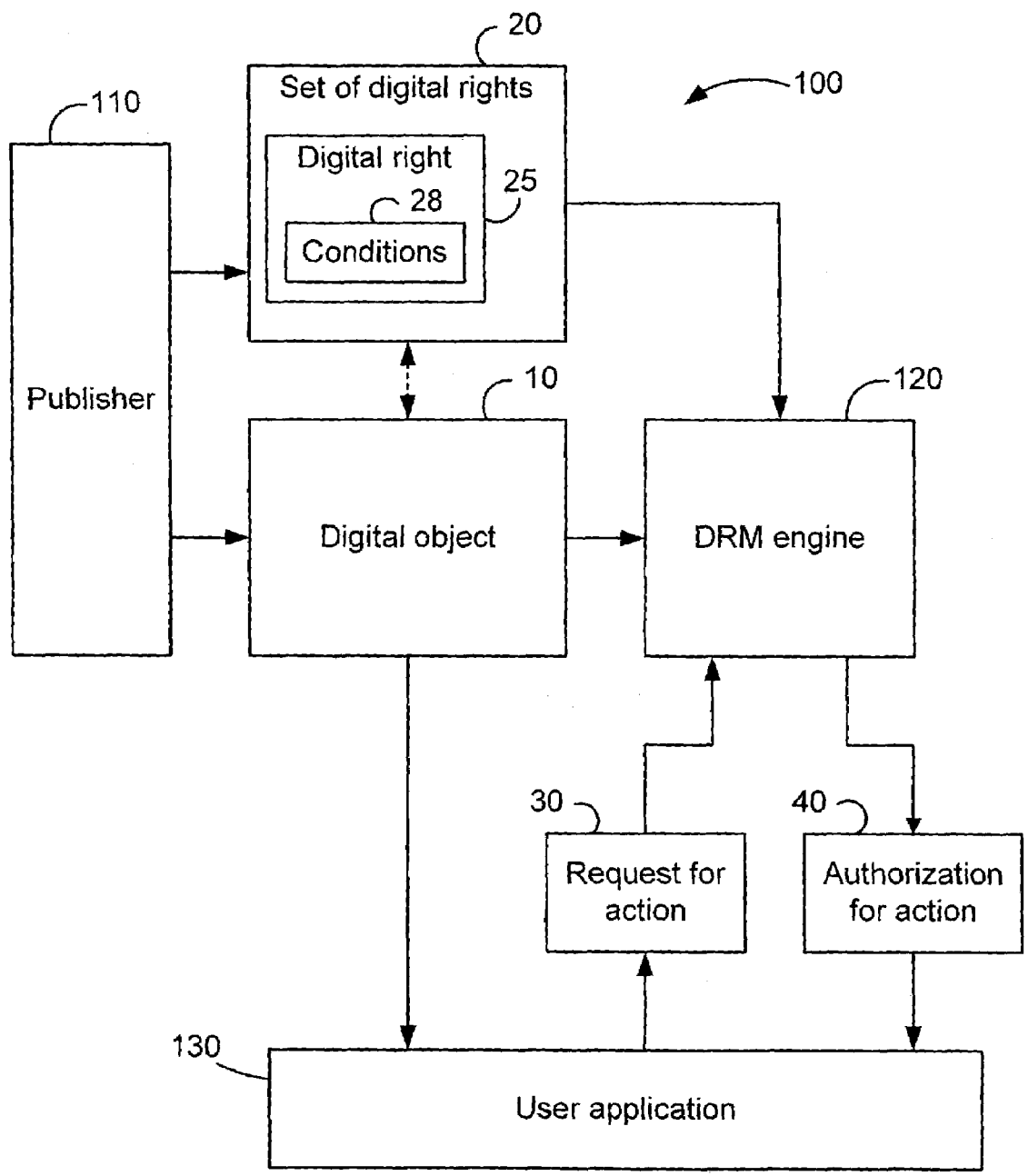
FIG. 1 is a schematic diagram showing a DRM system.

FIG. 1 shows a system 100 for digital rights management. The system 100 includes a publisher 110, a DRM engine 120, and a user application 130. The publisher 110 is a content owner that publishes a digital object 10. To protect content in the digital object 10, the publisher specifies a set of digital rights 20 for authorizing actions that involve the protected content. The DRM engine 120 can evaluate the set of digital rights 20 upon receiving a request 30 from the user application 130 to perform an action involving the digital object 10. Based on the evaluation, the DRM engine 120 provides or denies an authorization 40 for the action.

The digital object 10 is a collection of digital data that includes content such as text, images, video, instructions or other work that is subject to limited use and/or limited distribution. To protect such content, the digital object 10 is associated with the set of digital rights 20. For example, the publisher 110 can embed the set of digital rights 20 into the digital object 10. Alternatively, the set of digital rights 20 can be separate from the digital object 10. For example, the set of digital rights can be included in an object or file, such as a voucher or a license, or can be represented in a computer program. If the set of digital rights 20 is separate from the associated digital object 10, the digital object 10 can have a unique identifier that can be used by the set of digital rights 20 to identify the associated digital object 10. In addition, the set of digital rights 20 can also have an identifier that the digital object 10 can use to identify the separate but associated set of digital rights 20. In order to prevent unauthorized use or distribution, the publisher can encrypt content of the digital object 10 and/or the associated set of digital rights 20.

The set of digital rights 20 includes one or more digital rights, such as a digital right 25 shown in FIG. 1. The set of digital rights 20, similarly to the protection provided by copyright, can allow a content owner to exclude or authorize others: to reproduce the content; to prepare derivative works based upon the content; to distribute copies of the content to the public by sale, rental, lease, or lending; to display the content, e.g., the individual images of a motion picture or other audiovisual work; and, in the case of sound recordings, to perform the content.

Each digital right specifies at least one action that can be authorized using the digital right. For example, selling a digital object can be authorized using a "sell right," lending can be authorized using a "lend right," or giving away the digital object as a gift can be authorized using a "give right." Similarly, displaying, printing, or copying a content portion of the digital object can be authorized using a "display right," a "print right," or an "extract right," respectively. In one implementation, a retailer or a consumer is authorized to modify, e.g., narrow or broaden, one or more rights in the set of digital rights ("right to modify").

Optionally, a single digital right can be used for authorizing a collection of actions. For example, transfer-related actions, such as selling, lending, or giving away, can be authorized using an "AllTransfer right" (alone or in combination with other rights). Similarly, a single "AllUsage right" can be used for authorizing actions related to using content of the digital object, e.g., printing, displaying or copying such content. In addition, a hierarchy of rights can be defined for a digital object. In this implementation, multiple rights in the hierarchy are evaluated to authorize a single action, as discussed in more detail with reference to FIG. 8.

The set of digital rights 20 optionally specifies one or more conditions 28 on the digital right 25. Each of the conditions 28 specifies a restriction that can be imposed on using the digital right 25 to authorize an action. In one implementation, a condition on a right can include one or more condition parameters specifying limits of the restriction. For example, a condition on a right can restrict authorization to a geographical area or a device, and the condition parameters can identify the geographical area or the device, respectively. Conditions on a right can also restrict content that is available for an action specified by the right, and condition parameters can specify which portion of the content is available. Conditions on a right can restrict a scope of the right by limiting the action to one or more time intervals or to a maximum count for performing the action. Alternative or additional conditions can specify other restrictions, for example, a target device or data format.

Optionally, conditions on a right can have structure. In one implementation, a container condition can include multiple conditions. For example, a "Portion" condition can include conditions, e.g., a Portion start position condition and a Portion end position condition, that specify restrictions that can be imposed on a right. In one implementation, the container condition does not specify restrictions that can be imposed. Alternatively, the container condition can specify one or more restrictions that can be imposed on the right.

The publisher 110 can deliver the digital object 10 and the associated set of digital rights 20 to consumers directly, or indirectly, e.g., through a retailer, a distributor, or a library (e.g., an e-book library). The digital object 10 can be delivered through a computer network, such as the Internet, or using magnetic or other storage medium, such as a compact disc ("CD") or a digital versatile disc ("DVD").

By using the set of digital rights 20, computer applications, such as the user application 130, can be authorized to perform an action involving protected content in the digital object 10. For example, the user application 130 can send an authorization request 30 to the DRM engine 120. In response, the DRM engine 120 evaluates the set of digital rights 20 associated with the digital object 10, and provides or denies an authorization 40 for the requested action based on the evaluation of the set of digital rights 20.

In one implementation, the DRM engine 120 provides an authorization 40 if at least one right in the set of digital rights 20 specifies the requested action and all conditions on the right are satisfied. In alternative implementations, e.g., when the set of digital rights includes a hierarchy of rights, the DRM engine takes into account conditions on more than one right to authorize the action, as discussed with reference to FIG. 7.

To verify conditions on one or more rights, the DRM engine can evaluate other data, such as system parameters or metadata for the digital object 10. For example, the DRM engine can request a current date and/or a time of the date from the local system or from a remote service that is available through a computer network. In one implementation, the metadata includes information about previous actions involving the digital object 10. For example, the metadata can indicate the number of pages printed during a time period. The metadata can be included in the digital object, the associated set of digital rights, or stored at a remote location, e.g., by a storage service that is available through the Internet.

The authorization 40 authorizes the user application 130 to perform the requested action. In one implementation, the authorization 40 includes a decryption key to decode encrypted content in the digital object. In addition, the authorization 40 can specify restrictions on the requested action based on the set of digital rights. For example, the authorization 40 can set time limits for displaying content or a maximum number of pages for printing content. Optionally, the DRM engine 120 can record the action performed by the user application 130, e.g., as metadata in the digital object 10, the set of digital rights 20, and/or a remote storage server. The record of the action can be evaluated in the future to authorize actions that involve the digital object 10.

Figure 2:
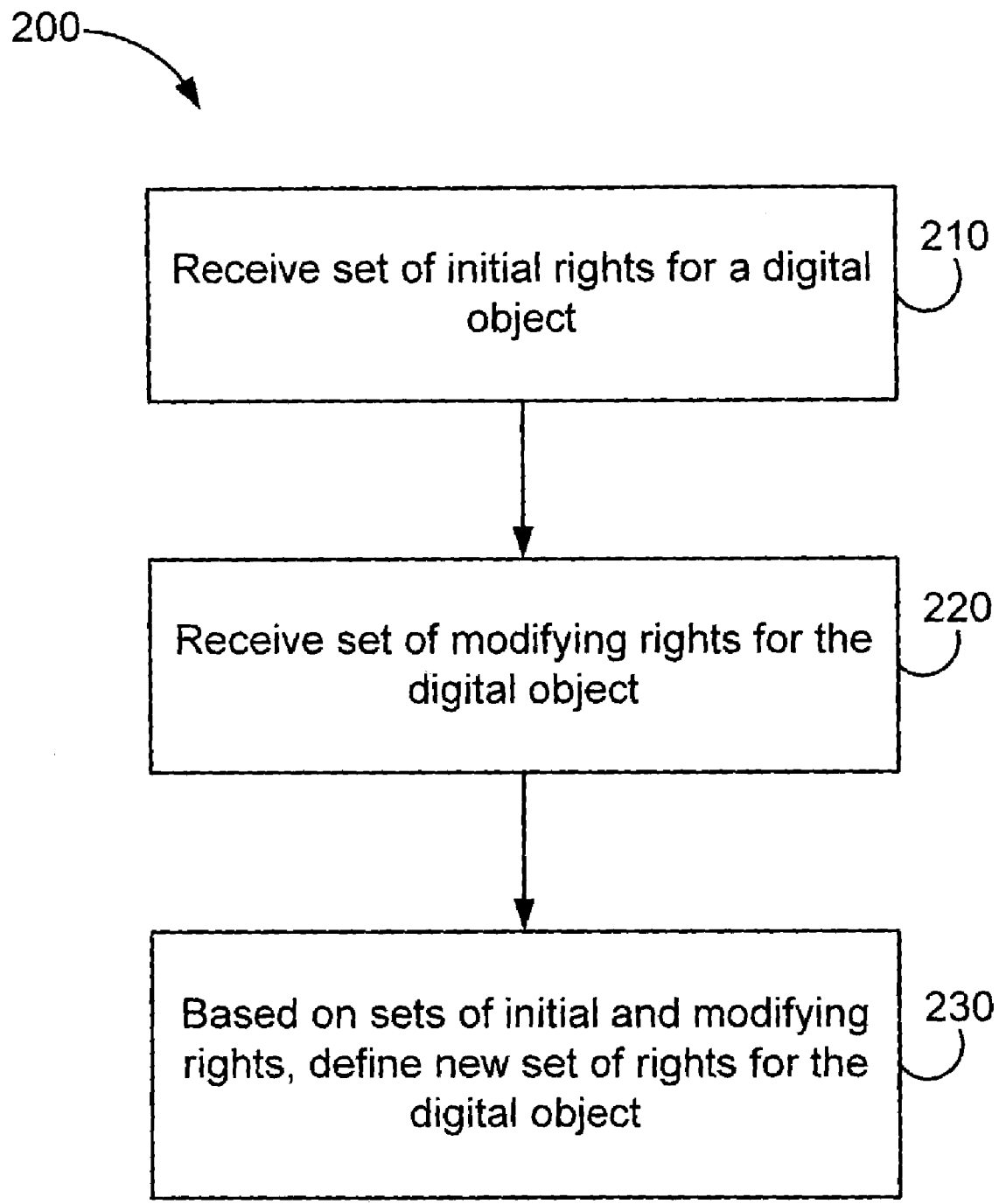
FIGS. 2, 4 and 6 are flow diagrams showing methods for modifying digital rights for a digital object.

FIG. 2 shows a method 200 for modifying digital rights associated with a digital object. The method 200 can be performed, e.g., by a DRM engine, such as the DRM engine 120 (FIG. 1). The DRM engine receives a set of initial rights for the digital object (step 210). The set of initial rights includes one or more initial rights, where each initial right specifies one or more actions. Optionally, the set of initial rights can specify conditions on one or more of the initial rights. In one implementation, the set of initial rights includes one or more rights to modify the set of initial rights. The rights to modify can specify whether the set of initial rights can be narrowed (i.e., becoming more restrictive), broadened (i.e., becoming less restrictive), or both. Optionally, the rights to modify can identify which rights in the set of initial rights can be modified. For example, each initial right can have an associated right to modify that specifies whether the right can be broadened, narrowed, or both.

The DRM engine receives a set of modifying rights for the digital object (step 220). The set of modifying rights includes one or more modifying rights, where each modifying right specifies one or more actions. Each modifying right can be used to define a new digital right for the actions specified by the modifying right. Optionally, the set of modifying rights can specify modifying conditions on one or more of the modifying rights. The set of modifying rights is associated with the digital object, e.g., by identifiers that identify the digital object and/or the set of initial rights. In addition, the set of modifying rights can indicate whether the set is defined to narrow and/or broaden the set of initial rights.

Based on the sets of initial and modifying rights, a new set of digital rights is defined for the digital object (step 230). The new set of rights can be defined to be narrower or, alternatively, broader than the set of initial rights, e.g., as indicated by the set of modifying rights. Techniques for defining the new set of digital rights are discussed in more detail with reference to FIGS. 3-6. In one implementation, the new set of digital rights is stored as a new voucher for authorizing actions involving the digital object. Alternatively, both the set of initial rights and the set of modifying rights can be stored and the DRM engine can use the sets of initial and modifying rights to define the new set of rights each time an application requests authorization for an action involving the digital object.

The method 200 can be used for more than one set of modifying rights. For example, a set of initial rights can be sequentially modified with a series of sets of modifying rights, where each of the sequential modifications is performed according to the method 200. In one implementation, the digital object is associated with a set of user rights, which is used to authorize actions and can be modified with a set of modifying rights, and a master set of rights, which sets limits for the set of user rights and cannot be modified. Each time the set of user rights is broadened according to a set of modifying rights, the broadened set of user rights is narrowed according to the master set of rights to avoid broadening the set of user rights beyond the limits set by the master set. The method 200 can be used for both the broadening according to the set of modifying rights and the narrowing according to the master set. Alternatively, limits on the set of user rights can be set by a hierarchy of rights, as discussed below with reference to FIG. 8.

Figure 3:
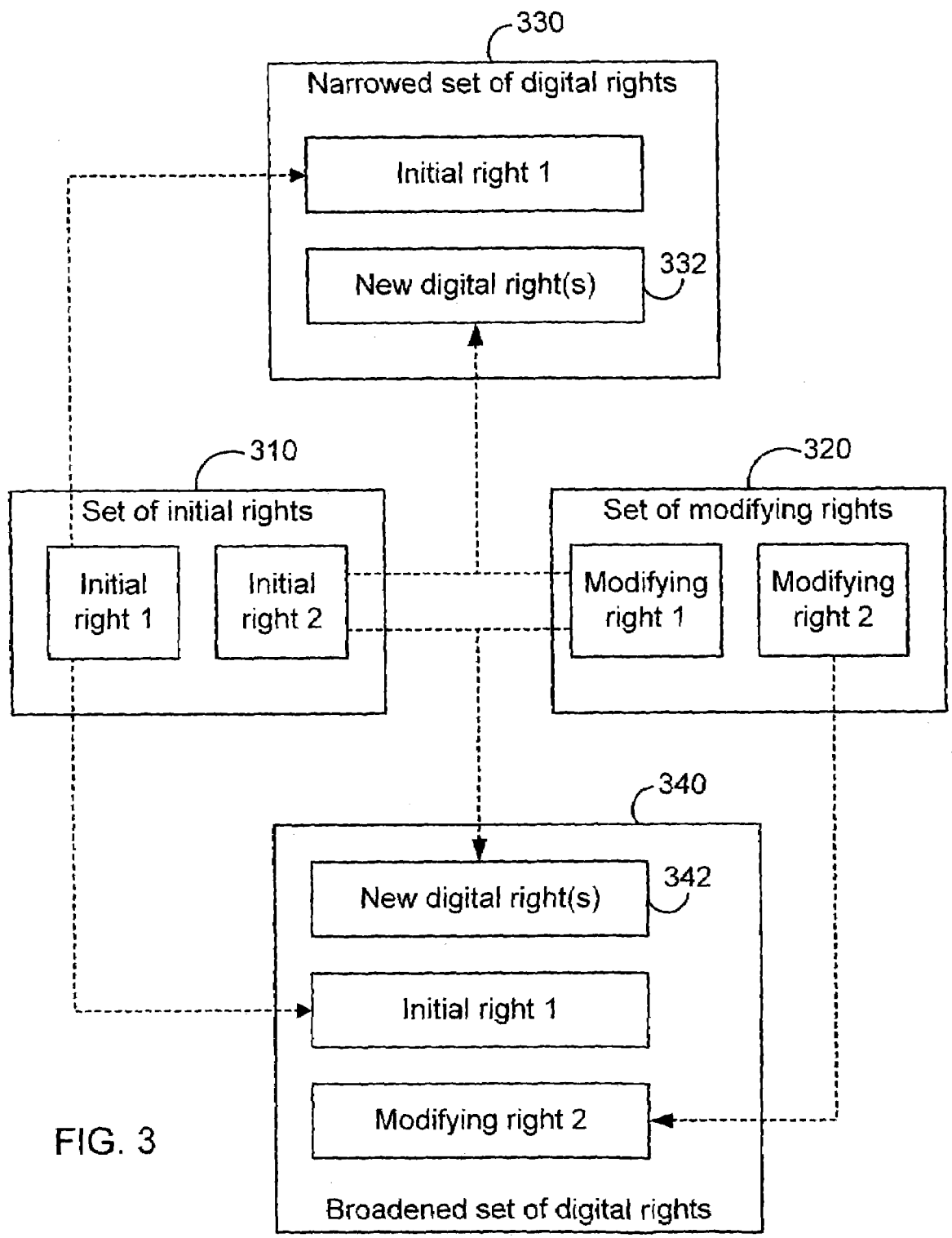
FIGS. 3 and 5 are schematic diagrams illustrating exemplary implementations of modifying digital rights.

FIG. 3 illustrates exemplary implementations of using a set of initial rights 310 and a set of modifying rights 320 to define a new set of digital rights for a digital object. The set of initial rights 310 includes a first and a second initial right for the digital object and the set of modifying rights 320 includes a first and a second modifying right for the digital object. In alternative implementations, the sets of initial and modifying rights can include an arbitrary number of rights.

In the exemplary implementations, the first modifying right "matches" the second initial right, the second modifying right does not match any of the initial rights, and the first initial right is not matched by any of the modifying rights. A modifying right matches an initial right when the modifying right specifies an action that can be authorized using the initial right. For example, the first modifying right matches the second initial right if both rights are print rights. Alternatively, the first modifying right can specify an action (e.g., selling) that is one of multiple actions (e.g., selling, lending, and giving) that can be authorized using the second initial right (e.g., a transfer right).

In a first exemplary implementation, the set of initial rights 310 and the set of modifying rights 320 are used to define a narrowed set of digital rights 330 for the digital object. The narrowed set 330 includes the first initial right, and one or more new digital rights 332. The one or more new digital rights 332 can be defined based on the first modifying right and the second initial right, e.g., by a method discussed below with reference to FIG. 4. In one implementation, the narrowed set of initial rights includes all unmatched initial rights. Accordingly, the narrowed set of digital rights 330 includes the first initial right even though the first initial right is not matched by any modifying right. In alternative implementations, a narrowed set of digital rights can be defined to include only digital rights that are defined based on matching initial and modifying rights.

In a second exemplary implementation, the set of initial rights 310 and the set of modifying rights 320 are used to define a broadened set of digital rights 340 for the digital object. The broadened set 340 includes the first initial right, the second modifying right and one or more new digital rights 342. The one or more new digital rights 342 can be defined based on the first modifying right and the second initial right, e.g., by a method discussed below with reference to FIG. 4. In one implementation, a broadened set of digital rights can be used to authorize all actions specified by the initial rights. Accordingly, the broadened set of digital rights 340 includes the first initial right that is not matched by any of the modifying rights.

In one implementation, the broadened set of rights can be used to authorize all actions that are specified by the modifying rights. Accordingly, the broadened set of digital rights 330 includes the second modifying right even though the second modifying right does not match any initial right. In alternative implementations, a broadened set of digital rights can be defined to include only those modifying rights that match an initial right.

Figure 4:
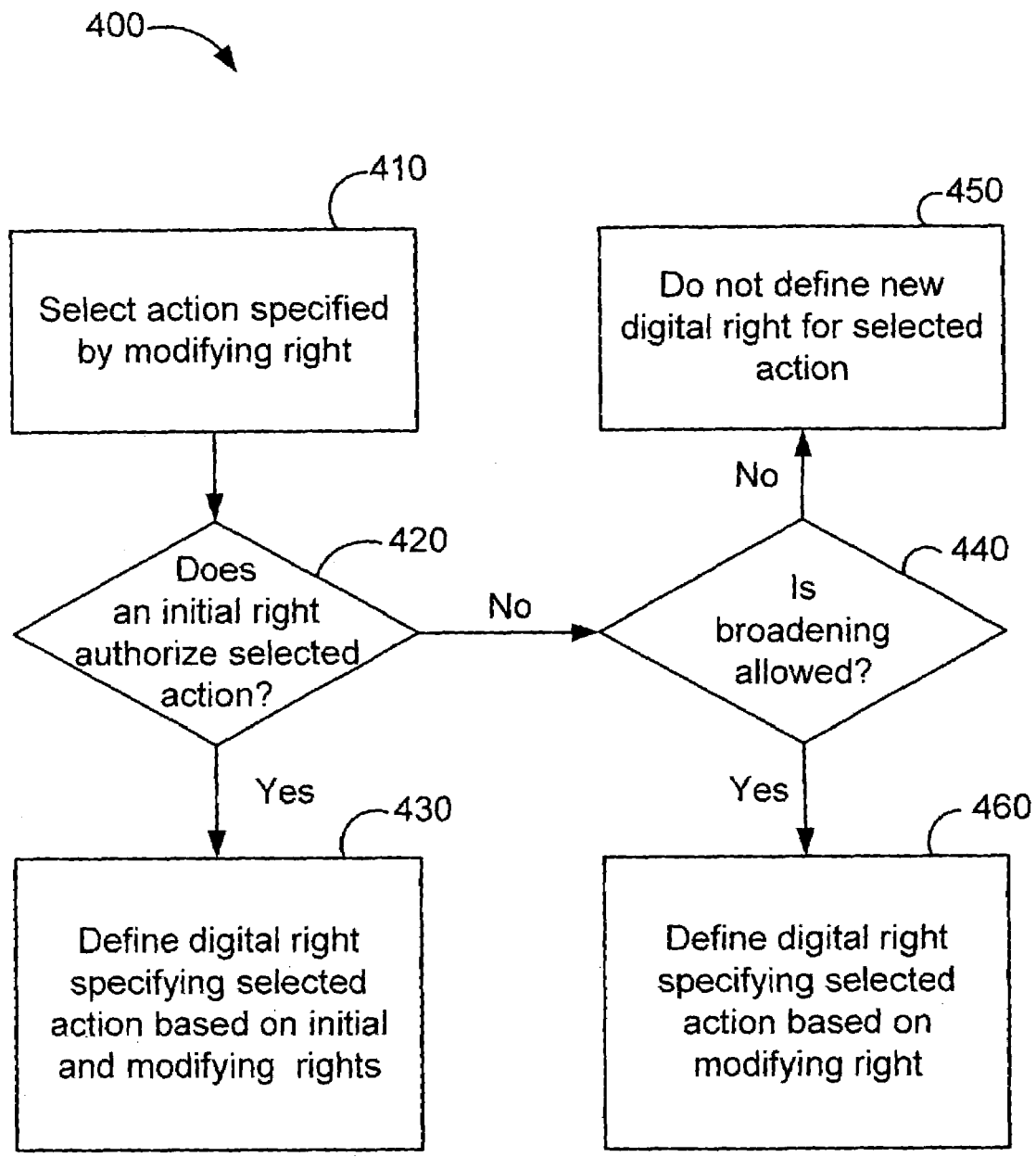

FIG. 4 shows a method 400 for defining a digital right for a digital object based on rights in a set of initial rights and a set of modifying rights. The set of initial rights includes one or more initial rights for authorizing actions involving the digital object. Optionally, the set of initial rights specifies conditions on one or more of the initial rights. The set of modifying rights includes one or more modifying rights that specify actions and, optionally, conditions on one or more of the modifying rights. Each modifying right can be used to define one or more digital rights that can authorize the actions specified by the modifying right. The method 400 can be performed by a system that includes a DRM engine to define a new set of digital rights, as discussed above with reference to FIGS. 1 and 2.

The system selects an action specified by a right in the set of modifying rights (step 410). In one implementation, each modifying right specifies a single action, and the system selects an action by selecting the modifying right that specifies the action. In alternative implementations, a modifying right can specify a collection of actions. For example, the set of modifying rights can include an AllTransfer right specifying, implicitly or explicitly, all system recognized transferring actions, e.g., lending and selling. In such implementations, the system can select any action in the collection, e.g., either lending or selling. Alternatively, the system can select the action of 'transferring' without specifying whether the transfer includes selling or lending.

The system determines whether the selected action can be authorized using an initial right in the set of initial rights (decision 420). In one implementation, the system searches for an initial right that is exactly matched by the selected action, i.e., an initial right specifying only the selected action. For example, if the selected action is printing, the system can look for a print right in the set of initial rights. In addition, e.g., if no perfectly matching initial right has been found, the system can look for an initial right that can be used to authorize a collection of actions that includes the selected action. For example, the set of initial rights can include an AllUsage right that can be used to authorize printing, displaying, or copying without a specific print right, display right, or extract right, respectively. If, however, the AllUsage right cannot authorize any action alone, i.e., without a specific usage right, the system does not consider such AllUsage right in the decision 420.

If an initial right can be used to authorize the selected action ("Yes" branch of decision 420), the system defines a digital right specifying the selected action based on the initial and modifying rights specifying the same action (step 430). In one implementation, the defined digital right specifies only the selected action, e.g., if the selected action is the only action specified by the initial right and the modifying right. Alternatively, e.g., if the initial right and/or the modifying right specify multiple actions, the defined digital right can also specify multiple actions that include the selected action.

If no initial right can be used to authorize the selected action ("No" branch of decision 420), the system checks whether the set of initial rights is allowed to be broadened (decision 440). Broadening can be allowed, for example, by an explicit right to modify in the set of initial rights. Alternatively or in addition, broadening can be allowed by information included in the set of modifying rights. If broadening is not allowed, ("No" branch of decision 440), the system does not define a digital right that specifies the selected action (step 450). If broadening is allowed ("Yes" branch of decision 440), the system defines a digital right specifying the selected action based on the modifying right (step 460). For example, the defined right can be the same right as the modifying right specifying the selected action.

The digital right defined by the method 400 can be included in a new set of rights, as discussed above with reference FIG. 3. For example, the method 400 can be repeated for each action specified by modifying rights to define digital rights in the new set (which can also include unmatched initial rights). In addition, the new set of rights can specify conditions on a defined digital right, e.g., based on conditions on initial and modifying rights that specify the selected action.

Figure 5:
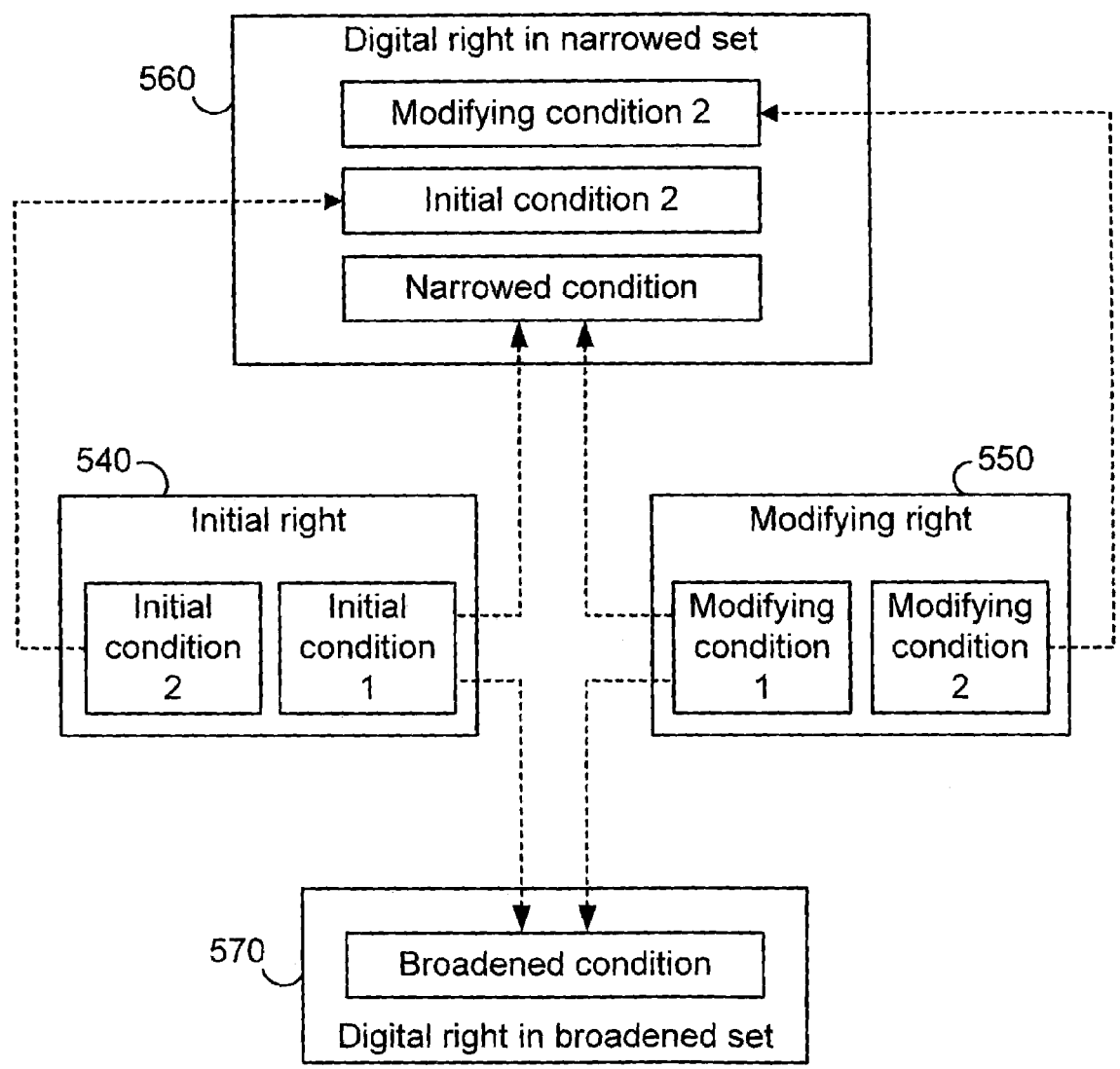

FIG. 5 illustrates exemplary implementations for defining conditions on a new digital right in a new set of rights for a digital document. The new digital right is defined based on an initial right 540 and a modifying right 550 in a set of initial rights and a set of modifying rights, respectively. The modifying right 550 matches the initial right 540, i.e., the modifying right 550 specifies an action that can be authorized by the initial right 540.

The set of initial rights specifies a first and a second initial condition on the initial right 540, and the set of modifying rights specifies a first and a second modifying condition on the modifying right 550. The first initial condition and the first modifying condition are matching conditions, and the second initial condition and the second modifying condition are non-matching conditions.

Matching conditions are conditions on rights, such as matching rights, that specify a common action. A modifying condition matches an initial condition if the modifying condition specifies a restriction that can be imposed by the initial condition. That is, the matching conditions impose the same type of restriction, e.g., a start time or an end time, on the common action. In one implementation, each of the matching conditions has one or more condition parameters. While imposing the same type of restriction, each of the matching conditions can specify different values for the condition parameters. For example, an initial condition can specify a different start time value for the common action than a matching modifying condition.

Based on the matching initial 540 and modifying 550 rights, a new digital right can be defined for authorizing the common action of the matching rights. In a first implementation, a new digital right 560 is defined in a narrowed set of rights, and in a second implementation, a digital right 570 is defined in a broadened set of rights. The narrowed set of rights specifies a narrowed condition on the right 560, and the broadened set of rights specifies broadened conditions on the digital right 570. The narrowed and broadened conditions on the rights 560 and 570, respectively, are defined based on the matching first initial and first modifying conditions. Methods for defining narrowed and broadened conditions are discussed with reference to FIG. 6.

In addition to the narrowed condition, the narrowed set of rights also imposes the unmatched second initial condition and the second modifying condition on the digital right 560. By imposing the unmatched initial condition on the right 560, the narrowed set of rights will not be less restrictive than the set of initial rights. By imposing the unmatched modifying condition on the right 560, the narrowed set of rights will impose all restrictions specified by the set of modifying rights.

The broadened set of rights specifies only the broadened condition on the digital right 570 without imposing the unmatched initial and modifying conditions. By omitting unmatched modifying conditions, the broadened set of rights will not be more restrictive than the set of initial rights. By omitting unmatched initial conditions, the broadened set of rights will not impose more restrictions than specified by the set of modifying rights. In alternative implementations, the broadened set of rights can include unmatched initial conditions. In this implementation, the broadened set preserves the original intent of the right owner unless a matching modifying right explicitly modifies an initial right.

Figure 6:
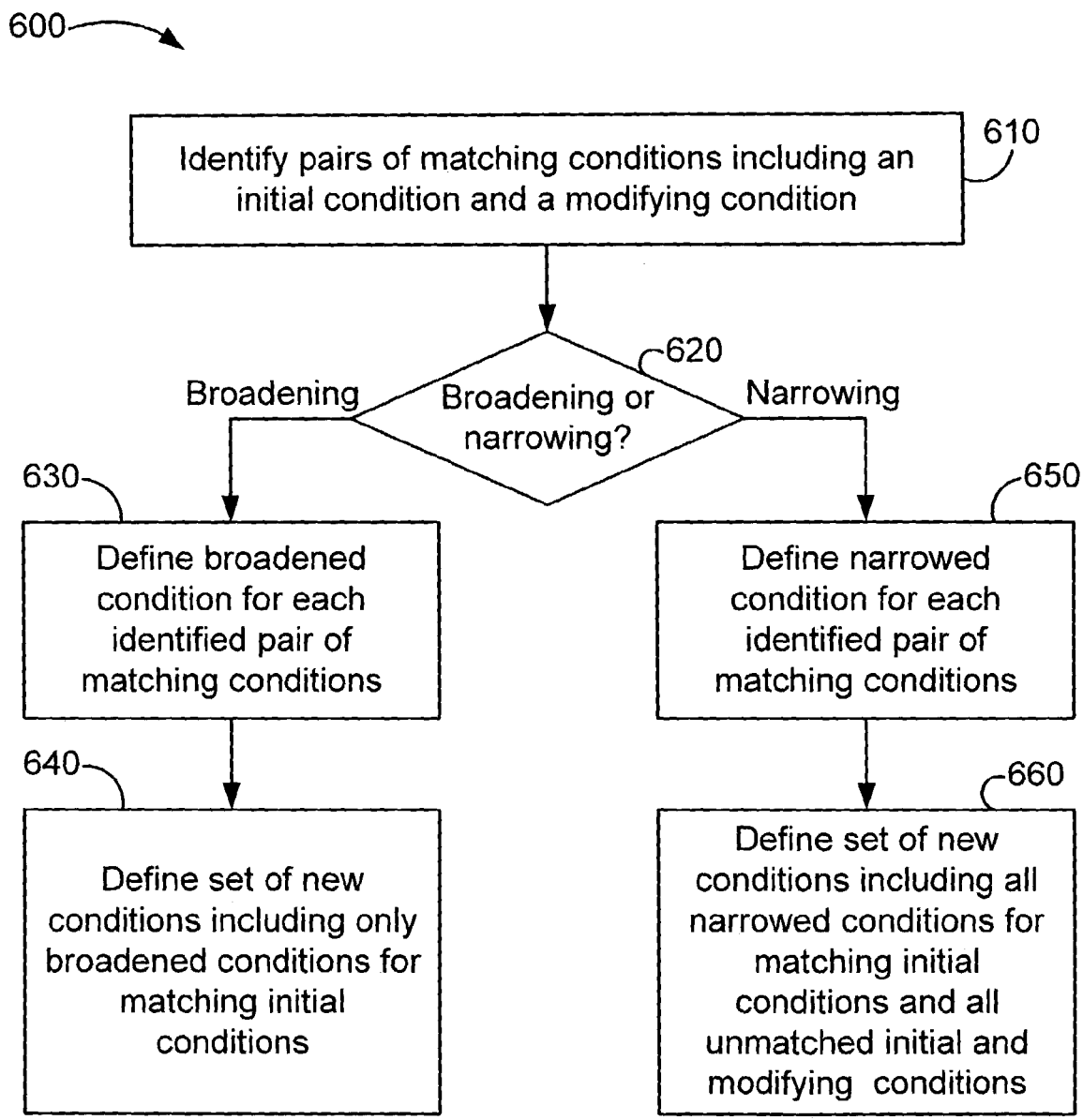

FIG. 6 shows a method 600 for specifying new conditions on a digital right. The method 600 can be performed, e.g., by the same system as the method 400, and can be used for defining a new set of digital rights based on a set of initial rights and a set of modifying rights. The set of initial rights includes an initial right that is matched by a modifying right, i.e., the modifying and initial rights specify a common action. The new set includes a new digital right specifying the common action, and specifies the new conditions on the new digital right.

The system identifies pairs of matching conditions (step 610). Each identified pair includes a modifying condition on the modifying right and a matching initial condition on the initial right. That is, the modifying condition specifies a restriction that can be imposed using the initial condition. In one implementation, the system identifies only those pairs of matching conditions for which the system has a combining rule. Combining rules are discussed in detail with reference to Tables 1 and 2.

The system checks whether the initial set of rights will be broadened or narrowed (decision 620). If a broadening is desired and allowed ("Broadening" branch of decision 620), the system defines a broadened condition on the new digital right for each identified pair of matching conditions (step 630). The broadened conditions specify identical or less restrictive conditions than the initial conditions. For example, the system defines one or more broadened condition parameters for each broadened condition based on condition parameters of the matching initial and modifying conditions. The broadened condition parameters specify an identical or less restrictive condition than the parameters in the initial condition.

In one implementation, broadened condition parameters are defined using combining rules such as broadening rules. A broadening rule defines a broadened condition parameter based on a specific type of initial and modifying parameters in the matching initial and modifying conditions, respectively. In one implementation, different broadening rules can be used for different types of matching conditions (e.g., there can be one broadening rule for "start time" conditions, another for "end time", and still another for "metered time length" conditions). Table 1 shows exemplary implementations for defining broadened condition parameters for matching initial and modifying conditions.

TABLE 1

| Matching condition | Initial (I) Parameter | Modifying (M) Parameter | Broadening Rule | Broadened Condition Parameter |
|---|---|---|---|---|
| Portion label | "Table of Contents" | "Table of Contents" and "Index" | Union of I, M | "Table of Contents" and "Index" |
| Portion start position | page 3 | page 5 | Earlier of I, M | page 3 |
| Portion end position | page 15 | page 20 | Later of I, M | page 20 |
| Portion quantity | 10 pages | 5 pages | Larger of I, M | 10 pages |
| Portion lifetime quantity | 100 pages | 1000 pages | Larger of I, M | 1000 pages |
| Start time | Mar. 27, 2002 | Apr. 18, 2002 | Earlier of I, M | Mar. 27, 2002 |
| End time | Dec. 31, 2002 | Dec. 31, 2003 | Later of I, M | Dec. 31, 2003 |
| Metered time length | 2 days | 6 hours | Larger of I, M | 2 days |
| Interval time length | 30 days | 10 days | Larger of I, M | 30 days |
| Interval number of recurrences | 3 | 5 | Larger of I, M | 5 |
| Exercise count | 10 | 4 | Larger of I, M | 10 |
| Exercise lifetime count | 100 | 50 | Larger of I, M | 100 |

In Table 1, the first column is an exemplary list of matching initial and modifying conditions. The second and third columns show exemplary initial and modifying condition parameters, respectively, for the matching condition. The fourth column shows broadening rules for defining broadened condition parameters, and the fifth column shows broadened condition parameters generated by applying the broadening rules for the exemplary initial and modifying condition parameters.

As shown in the first column of Table 1, for a common action specified by matching initial and modifying rights, a matching condition can restrict the common action to a content portion that can be identified, for example, by a portion label, such as a chapter title, or a portion start position and a portion end position. A portion quantity specifies a quantity, such as a total number of pages or words, that measures content available for the common action. In addition, a portion lifetime quantity can set a maximum portion limit, e.g., a maximum of 30 pages even if other conditions would allow more, say, 5 pages every 3 days. If start and end times are specified, typically in absolute time units, the common action can be authorized only after the start time and before the end time. A metered time length specifies duration for the common action, such as displaying content. Performing the common action for the first time can start an interval that has a preset time length during which the common action can be repeatedly authorized. If an interval can recur, an interval number of recurrences limits the number of times the interval can be restarted. The number of authorizations is limited by an exercise count during an interval, and by an exercise lifetime count during a lifetime of the digital object. In Table 1, each condition has one initial, modifying, and broadened parameter. In alternative implementations, a condition can have multiple initial, modifying, and/or broadened parameters.

As shown in the fourth column of Table 1, broadening rules define broadened condition parameters based on comparing an initial and a modifying parameter. In alternative implementations, the broadening rules can be based on more than two parameters. If the system is unable to perform a comparison of the initial and modifying parameters, the broadened condition parameter is defined as the initial condition parameter. For example, the initial and modifying condition parameters can have different units that the system may be unable to compare. For example, an interval time length can be specified by a modifying condition in months and by a matching initial condition in hours. If the application (or the system) does not have a strict conversion rule between a month and an hour, the system may be unable to compare the modifying and initial condition parameters. Similarly, an initial condition restricting printing in number of words may not be comparable to a modifying condition restricting printing in number of pages, because the number of pages does not depend exclusively on the number of words. In these cases, the system can avoid unintentional narrowing or broadening by keeping the initial condition parameters.

After defining broadened conditions on the new digital right for each pair of matching conditions, the system defines a set of new conditions on the new digital right, where the set of new conditions includes only the broadened conditions (step 640). That is, the set of new conditions does not include unmatched conditions on the initial and modifying rights. In alternative implementations, the set of new conditions can include unmatched initial conditions. The set of new conditions can be imposed on the new digital right in the new set of rights. Because the broadened conditions on the new digital right are the same or broader than the matching initial conditions on the initial right, the set of new conditions will not narrow the new set of rights relative to the initial set of rights.

If, instead of broadening, a narrowing is desired and allowed ("Narrowing" branch of decision 620), the system defines a narrowed condition on the new digital right for each identified pair of matching conditions (step 650). The narrowed conditions specify identical or more restrictive conditions on the new digital right than the initial conditions on the initial right. For example, the system defines one or more narrowed condition parameters for each narrowed condition based on condition parameters of matching initial and modifying conditions. The narrowed condition parameters specify an identical or more restrictive condition on the new digital right than the parameters in the initial condition on the initial right.

In one implementation, narrowed condition parameters are defined using combining rules such as narrowing rules. A narrowing rule defines a narrowed condition parameter based on specific type of initial and modifying parameters in the matching initial and modifying conditions, respectively. In one implementation, different narrowing rules can be used for different types matching conditions. Table 2 shows exemplary implementations for defining narrowed condition parameters for matching pairs of initial and modifying conditions.

TABLE 2

| Matching condition | Initial (I) Parameter | Modifying (M) Parameter | Narrowing Rule | Narrowed Condition Parameter |
|---|---|---|---|---|
| Portion label | "Table of Contents" | "Table of Contents" and "Index" | Intersection of I, M (if empty, | "Table of Contents" |

TABLE 2-continued

| Matching condition | Initial (I) Parameter | Modifying (M) Parameter | Narrowing Rule | Narrowed Condition Parameter |
|---|---|---|---|---|
| | | | action is not permitted) | |
| Portion start position | page 3 | page 5 | Later of I, M | page 5 |
| Portion end position | page 15 | page 20 | Earlier of I, M | page 15 |
| Portion quantity | 10 pages | 5 pages | Smaller of I, M | 5 pages |
| Portion lifetime quantity | 100 pages | 1000 pages | Smaller of I, M | 100 pages |
| Start time | Mar. 27, 2002 | Apr. 18, 2002 | Later of I, M | Apr. 18, 2002 |
| End time | Dec. 31, 2002 | Dec. 31, 2003 | Earlier of I, M | Dec. 31, 2002 |
| Metered time length | 2 days | 6 hours | Smaller of I, M | 6 hours |
| Interval time length | 30 days | 10 days | Smaller of I, M | 10 days |
| Interval number of recurrences | 3 | 5 | Smaller of I, M | 3 |
| Exercise count | 10 | 4 | Smaller of I, M | 4 |
| Exercise lifetime count | 100 | 50 | Smaller of I, M | 50 |

Table 2 shows the same matching conditions (first column), initial (second column) and modifying (third) condition parameters as Table 1. Instead of the broadening rules shown in Table 1, Table 2 shows narrowing rules (fourth column) that provide narrowed parameters (fifth column) specifying identical or more restrictive conditions than the initial parameters. As discussed with reference to defining broadened condition parameters (step 630), if the system is unable to compare an initial condition parameter and a modifying condition parameter, the narrowed condition parameter can be defined to be the initial condition parameter. Alternatively, in the case of narrowing, the system can treat conditions with incomparable condition parameters as unmatched conditions.

After defining narrowed conditions on the new digital right for each matching initial condition, the system defines a set of new conditions on the new digital right (step 660), where the set of new conditions includes not only all narrowed conditions for pairs of matching conditions but also all unmatched initial and modifying conditions on the initial and modifying rights, respectively. The set of new conditions can be imposed on the new digital right in the new set of rights. Because the set of new conditions includes not only the narrowed conditions, which are the same or narrower than the matching initial conditions, but also all unmatched conditions on the initial and modifying rights, the set of new conditions will broaden the new set of rights relative to the initial set of rights.

Optionally, the system can implement rules for resolving inconsistencies in the new set of rights. Such inconsistencies may arise from using the methods 400 and 600 to define the new set of rights. For example during narrowing, if the conditions on the modifying right specify only a start time without an end time for an action, the start time may exceed an end time specified in the condition for the initial right. Such inconsistencies are automatically resolved in a system that authorizes an action only if all conditions on the action are satisfied. However, resolving the inconsistencies can make the system simpler and more efficient.

Examples of rules for resolving inconsistencies in the new set of digital rights can include the following: if a portion start position exceeds the end position for a digital right in the new set, the system can remove the digital right from the new set of rights; if a portion quantity exceeds a portion lifetime quantity, the system can reduce the portion quantity to the portion lifetime quantity; if a start time is later than an end time for a digital right, the system can remove the right from the new set of digital rights; if a metered time length exceeds the difference between start time and end time, the system can reduce the metered time length to the difference between start time and end time; if an interval time length exceeds the difference between start time and end time, the system can reduce the interval time length to the difference between start time and end time; and if an exercise count exceeds exercise lifetime count, the system can reduce the exercise count to exercise lifetime count. Alternative or additional rules for resolving inconsistencies can be defined, e.g., according to characteristics of a particular application.

Figure 7A:
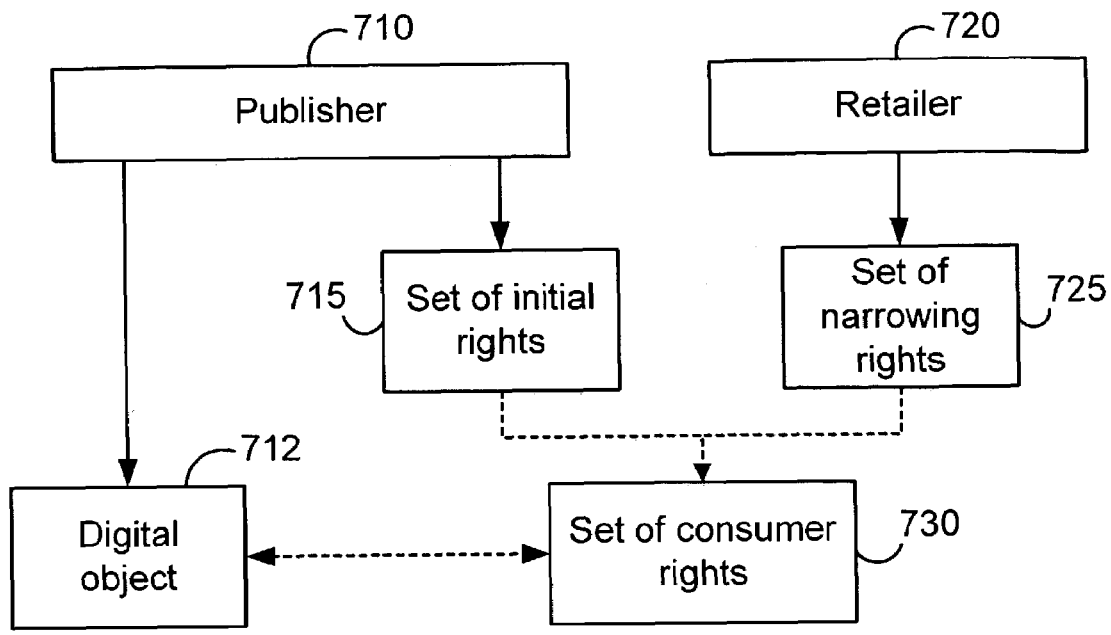
FIGS. 7A and 7B are schematic diagrams illustrating modifying digital rights in exemplary business models.
Figure 7B:
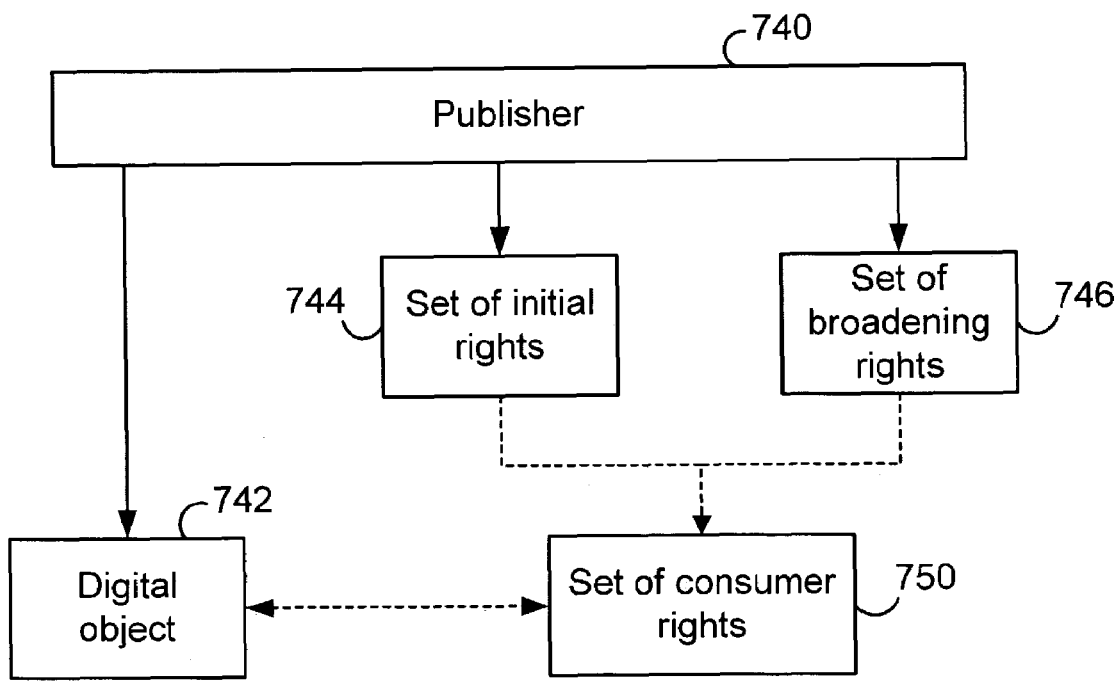

FIGS. 7A and 7B are schematic diagrams illustrating business models requiring narrowing and broadening, respectively, a set of initial rights that is associated with a digital object. As shown in FIG. 7A, a publisher 710 publishes a digital object 712 with a set of initial rights 715. The set of initial rights 715 can be a minimally restrictive set of rights that can be further narrowed by a distributor, e.g., a retailer 720, that is allowed to distribute rights for the digital object. In alternative implementations, the distributor can be a library, e.g., an e-book library, that lends the digital object to consumers. The retailer 720 can impose narrowing restrictions on the set of initial rights 715 by specifying a set of narrowing rights 725. Based on the set of initial rights 715 and the set of narrowing rights 725, a DRM engine can define a set of consumer rights 730 that is narrower, i.e., not less restrictive, than the set of initial rights 715, as discussed above with reference to FIGS. 2-6.

Narrowing an initial set of rights 715 may be required, e.g., to sell the digital object 712 to consumers with a plurality of options, where each option has a different set of consumer rights 730 and, accordingly, a different price. Alternatively or in addition, a retailer or an e-book library may want to lend the digital object 712 to consumers for a rental period and limit the consumers to using the digital object only in the rental period.

As shown in FIG. 7B, a publisher 740 can sell a digital object 742 with a set of initial rights 744 to a consumer. After the sale, the consumer wants to buy additional rights for the digital object 742. The consumer buys a set of broadening rights 746 and, based on the set of initial rights 744 and the set of broadening rights 746, a DRM engine can define a set of consumer rights 750 that is broader, i.e., not more restrictive, than the set of initial rights 744, as discussed above with reference to FIGS. 2-6. The consumer can buy the set of broadening rights independently from the set of initial rights. In alternative implementations, the consumer can buy sets of broadening rights from one or more retailers instead of the publisher that issued the set of initial rights. When multiple retailers compete to sell rights for a digital object, consumers can benefit from the competition between the retailers.

Figure 8:
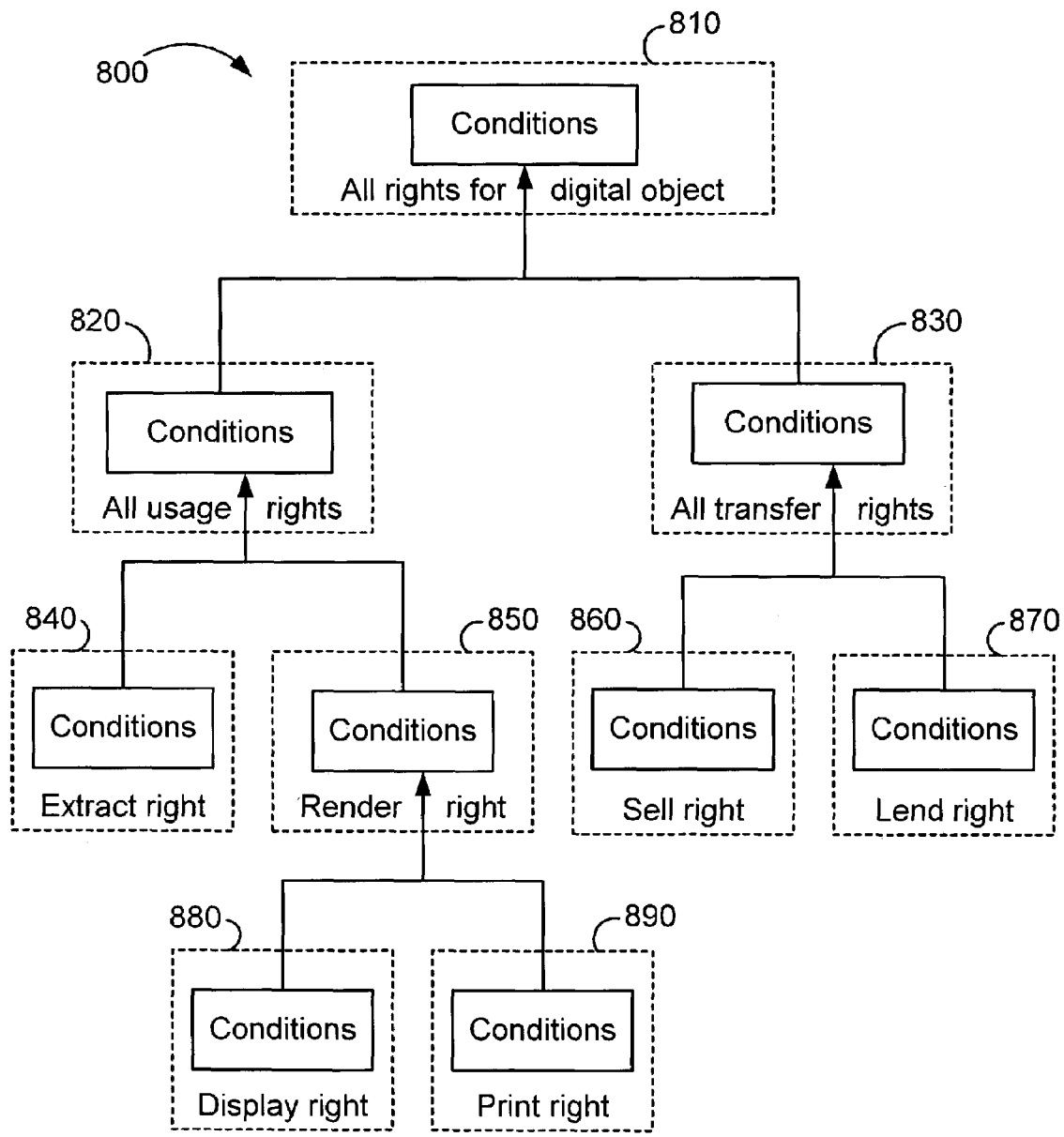
FIG. 8 is a schematic diagram illustrating an exemplary hierarchy of rights.

FIG. 8 shows an exemplary hierarchy of rights 800 that can be defined by a set of digital rights for a digital object. The hierarchy 800 includes rights objects 810-830 and digital rights 840-890. In one implementation, the rights objects 810-830 cannot be used to authorize an action involving the digital object without a specific right, such as the digital rights 840-890.

In alternative implementations, a rights object, such as the rights object 820 or 830, can be used to authorize actions if the rights object is a leaf in the hierarchy, i.e., no other rights object or specific digital right is below the rights object in the hierarchy. For example, in a hierarchy that is similar to the hierarchy 800 but does not include the digital rights 840-890, the rights object 820 for all usage rights can be used to authorize actions such as printing, displaying, and copying.

On the top of the hierarchy 800, the rights object 810 specifies all rights for the digital objects. The conditions on the rights object 810 specify restrictions that are imposed on all actions involving the digital object. For example, a publisher can set an overall expiration for all the rights on the digital object. Immediately below the top, the hierarchy 800 includes the rights objects 820 and 830. The rights object 820 specifies all usage rights and the rights object 830 specifies all transfer rights.

Conditions on the all usage rights object 820 specify restrictions for any usage of the digital object. Accordingly, the conditions on the rights object 820 are imposed on each usage right, such as an extract right 840 and a render right 850 below the rights object 820 in the hierarchy 800. The extract right 840 and the render right 850 can be used to authorize copying and rendering, respectively, content of the digital document. On the next level of the hierarchy 800, the render right 850 includes the display right 880 for displaying and the print right 890 for printing content of the digital document.

Conditions on the all transfer rights object 830 specify restrictions for any transfer of the digital object. Accordingly, the conditions on the rights object 830 are imposed on each transferring right, such as a sell right 860 and a lend right 870 below the rights object 830 in the hierarchy 800. The sell right 860 and the lend right 870 can be used to authorize selling and lending, respectively, the digital object.

In addition to the conditions on the rights objects 810-830, the set of digital rights explicitly specifies conditions on each of the digital rights 840-890. The conditions on a digital right specify restrictions that are to be imposed on authorizing the action specified by the digital right. Furthermore, the conditions on the render right 850 are also imposed on the display right 880 and the print right 890.

In one implementation, a DRM engine can impose all the above conditions on the rights in the set of rights, for example, by using the techniques discussed with reference to FIGS. 5 and 6. To authorize an action (for example, to authorize selling), the DRM engine constructs restrictions by combining conditions on rights in the hierarchy 800. First, the DRM engine considers the right specifying the action (i.e., the sell right 860 in the example) as an initial right and a right immediately above in the hierarchy 800 (i.e., rights object 830) as a modifying right. Based on the conditions on the initial and modifying rights, the DRM engine defines a new set of conditions that are narrower, i.e., not less restrictive, than the conditions on the initial right. For authorizing the action, the new set of conditions can replace the conditions on the initial right.

In one implementation, the initial and modifying rights can be considered as matching rights (they are specifying the same action, selling). Accordingly, the DRM engine can define a new set of conditions, e.g., by using combining rules as discussed with reference to FIGS. 5 and 6. For example, the new set of conditions can include all unmatched conditions on the initial and modifying rights, and narrowed conditions based on matching conditions on the initial and modifying rights according to Table 2.

If there is a next level in the hierarchy, the new set of conditions are considered as conditions on the next initial right (i.e., the sell right 860 modified by the rights object 830) and the conditions on the rights object on the next level (i.e., the rights object 810) as the next modifying right. Based on the conditions on the next initial right and the next modifying right, another set of new conditions is defined that is narrower than the conditions on the next initial right (i.e., the first new set of conditions).

The DRM engine repeats defining another set of new conditions until reaching the top of the hierarchy 800 on a path indicated by arrows in FIG. 8. As a result, the final set of new conditions will impose all the conditions on the path between the digital right specifying the action and the top of the hierarchy 800. The final set of new conditions can be evaluated to authorize the action.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display)

monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A method for defining rights applicable to a digital object, the method comprising:
    receiving a set of initial rights for the digital object and a set of modifying rights for the digital object, at least one of the set of initial rights and the set of modifying rights specifying one or more conditions on rights in the respective set of rights;
    defining a new set of rights for the digital object based on the set of initial rights and the set of modifying rights, the new set of rights specifying one or more new conditions on rights in the new set of rights, the new conditions being defined based on one or more of the conditions in the set of initial rights and/or the set of modifying rights;
    selecting one or more ancestor rights for the digital object in a hierarchy of rights defined by the new set of rights, the one or more ancestor rights being above a child right and a parent right in the hierarchy, the hierarchy specifying one or more of the new conditions on one or more of the ancestor rights and the child right; and
    for each of the one or more ancestor rights, recursively modifying one or more conditions defined on the child right based on one or more conditions on the ancestor rights.

2. The method of claim 1, wherein:
    defining a new set of rights for the digital object includes defining the new set of rights to be equally restrictive as or more restrictive than the set of initial rights.

3. The method of claim 2, wherein:
    the new set of rights includes each right that is included both in the set of initial rights and the set of modifying rights.

4. The method of claim 2, wherein:
    the new set of rights includes all rights in the set of initial rights.

5. The method of claim 2, wherein:
    each of the new conditions specified by the new set of rights is defined to be equally restrictive as or more restrictive than the one or more conditions on which the new condition is based.

6. The method of claim 1, wherein:
    defining a new set of rights for the digital object includes defining the new set of rights to be equally restrictive as or less restrictive than the set of initial rights.

7. The method of claim 6, wherein:
    the new set of rights includes all rights in the set of initial rights and the set of modifying rights.

8. The method of claim 6, wherein:
    each of the new conditions specified by the new set of rights is defined to be equally restrictive as or less restrictive than the one or more conditions on which the new condition is based.

9. The method of claim 1, further comprising:
    resolving conflicts between the new conditions specified by the new set of rights.

10. The method of claim 1, wherein:
    receiving a set of initial rights and a set of modifying rights includes receiving a common right that is included in the set of initial rights and in the set of modifying rights; and
    defining the new set of rights for the digital object includes defining the new set of rights to include the common right.

11. The method of claim 10, wherein:
    the set of modifying rights specifies one or more modifying conditions on the common right; and
    the new set of rights specifies one or more new conditions on the common right, the new conditions on the common right being based on the modifying conditions on the common right.

12. The method of claim 11, wherein:
    the set of initial rights specifies one or more initial conditions on the common right; and
    the new conditions on the common right are based on the initial conditions on the common right.

13. The method of claim 12, wherein defining a new set of rights includes:
    identifying a pair of conditions, the pair of conditions including one of the initial conditions on the common right and one of the modifying conditions on the common right; and
    defining a new condition on the common right based on the identified pair of conditions.

14. The method of claim 13, wherein a condition in the identified pair of conditions includes one or more condition parameters, and wherein:
    defining a new condition on the common right includes defining a new condition parameter based on the one or more condition parameters in the identified pair using a combining rule.

15. The method of claim 1, wherein:
    receiving a set of initial rights includes receiving a right to modify one or more initial rights.

16. A method for defining conditions on a right applicable to a digital object, the method comprising:
    selecting a child right for the digital object and a parent right for the digital object in a hierarchy of rights including a plurality of levels, the child right being below the parent right in the hierarchy, the hierarchy of rights specifying one or more conditions on the child right and the parent right;

defining a set of new conditions on the child right, the set of new conditions including one or more conditions that are defined based on one or more of the conditions on the child and parent rights using condition specific combining rules;

selecting one or more ancestor rights for the digital object in the hierarchy of rights, the one or more ancestor rights being above the child right and the parent right in the hierarchy, the hierarchy specifying one or more conditions on each of the one or more ancestor rights; and for each of the one or more ancestor rights, recursively modifying one or more of the conditions defined on the child right based on one or more conditions on the ancestor rights.

17. A method for distributing digital rights, the method comprising:

specifying a set of initial rights for the digital object;

specifying a set of modifying rights for the digital object, wherein at least one of the set of initial rights and the set of modifying rights specifies one or more conditions on rights in the respective set of rights, and wherein the set of modifying rights can be used to define a new set of rights for the digital object based on the set of initial rights, the new set of rights specifying one or more new conditions on rights in the new set of rights, the new conditions being defined based on one or more of the conditions in the set of initial rights and/or the set of modifying rights;

distributing the set of initial rights and the set of modifying rights separately;

selecting one or more ancestor rights for the digital object in a hierarchy of rights defined by the new set of rights, the one or more ancestor rights being above a child right and a parent right in the hierarchy, the hierarchy specifying one or more of the new conditions on one or more of the ancestor rights and the child right; and for each of the one or more ancestor rights, recursively modifying one or more conditions defined on the child right based on one or more conditions on the ancestor rights.

18. The method of claim 17, wherein:

specifying a set of initial rights and a set of modifying rights for the digital object includes specifying the set of initial rights and the set of modifying rights by a publisher of the digital object.

19. The method of claim 17, wherein:

specifying a set of initial rights for the digital object includes specifying the set of initial rights by a publisher of the digital object; and specifying a set of modifying rights for the digital object includes specifying the set of modifying rights by a distributor.

20. A method for distributing digital rights, the method comprising:

receiving a set of initial rights for the digital object;

specifying a set of modifying rights for the digital object, wherein at least one of the set of initial rights and the set of modifying rights specifies one or more conditions on rights in the respective set of rights;

defining a new set of rights for the digital object based on the set of initial rights and the set of modifying rights, the new set of rights specifying one or more new conditions on rights in the new set of rights, the new conditions being defined based on one or more of the conditions in the set of initial rights and/or the set of modifying rights;

distributing the new set of rights for the digital object;

selecting one or more ancestor rights for the digital object in a hierarchy of rights defined by the new set of rights, the one or more ancestor rights being above a child right and a parent right in the hierarchy, the hierarchy specifying one or more of the new conditions on one or more of the ancestor rights and the child right; and for each of the one or more ancestor rights, recursively modifying one or more conditions defined on the child right based on one or more conditions on the ancestor rights.

21. A computer program product, embodied in a machine-readable storage device, for defining rights applicable to a digital object, the computer program product comprising instructions operable to cause data processing apparatus to:

receive a set of initial rights for the digital object and a set of modifying rights for the digital object, at least one of the set of initial rights and the set of modifying rights specifying one or more conditions on rights in the respective set of rights;

define a new set of rights for the digital object based on the set of initial rights and the set of modifying rights, the new set of rights specifying one or more new conditions on rights in the new set of rights, the new conditions being defined based on one or more of the conditions in the set of initial rights and/or the set of modifying rights;

selecting one or more ancestor rights for the digital object in the hierarchy of rights defined by the new set of rights, the one or more ancestor rights being above the child right and the parent right in the hierarchy, the hierarchy specifying one or more of the new conditions on one or more of the ancestor rights and the child right; and for each of the one or more ancestor rights, recursively modifying one or more of the conditions defined on the child right based on one or more conditions on the ancestor rights.

22. The computer program product of claim 21, wherein instructions operable to cause data processing apparatus to define a new set of rights for the digital object include instructions operable to cause data processing apparatus to:

define the new set of rights to be equally restrictive as or more restrictive than the set of initial rights.

23. The computer program product of claim 22, wherein:

the new set of rights includes each right that is included both in the set of initial rights and the set of modifying rights.

24. The computer program product of claim 22, wherein:

the new set of rights includes all rights in the set of initial rights.

25. The computer program product of claim 22, wherein:

each of the new conditions specified by the new set of rights is defined to be equally restrictive as or more restrictive than the one or more conditions on which the new condition is based.

26. The computer program product of claim 21, wherein instructions operable to cause data processing apparatus to define a new set of rights for the digital object include instructions operable to cause data processing apparatus to:

define the new set of rights to be equally restrictive as or less restrictive than the set of initial rights.

27. The computer program product of claim 26, wherein:
the new set of rights includes all rights in the set of initial rights and the set of modifying rights.

28. The computer program product of claim 26, wherein:
each of the new conditions specified by the new set of rights is defined to be equally restrictive as or less restrictive than the one or more conditions on which the new condition is based.

29. The computer program product of claim 21, further comprising instructions operable to cause data processing apparatus to:
resolve conflicts between the new conditions specified by the new set of rights.

30. The computer program product of claim 21, wherein:
instructions operable to cause data processing apparatus to receive a set of initial rights and a set of modifying rights include instructions operable to cause data processing apparatus to receive a common right that is included in the set of initial rights and in the set of modifying rights; and
instructions operable to cause data processing apparatus to define the new set of rights for the digital object include instructions operable to cause data processing apparatus to define the new set of rights to include the common right.

31. The computer program product of claim 30, wherein:
the set of modifying rights specifies one or more modifying conditions on the common right; and
the new set of rights specifies one or more new conditions on the common right, the new conditions on the common right being based on the modifying conditions on the common right.

32. The computer program product of claim 31, wherein:
the set of initial rights specifies one or more initial conditions on the common right; and
the new conditions on the common right are based on the initial conditions on the common right.

33. The computer program product of claim 32, wherein instructions operable to cause data processing apparatus to define a new set of rights include instructions operable to cause data processing apparatus to:
identify a pair of conditions, the pair of conditions including one of the initial conditions on the common right and one of the modifying conditions on the common right; and
define a new condition on the common right based on the identified pair of conditions.

34. The computer program product of claim 33, wherein a condition in the identified pair of conditions includes one or more condition parameters, and wherein instructions operable to cause data processing apparatus to define a new condition on the common right include instructions operable to cause data processing apparatus to:
define a new condition parameter based on the one or more condition parameters in the identified pair using a combining rule.

35. The computer program product of claim 21, wherein instructions operable to cause data processing apparatus to receive a set of initial rights include instructions operable to cause data processing apparatus to:
receive a right to modify one or more initial rights.

36. A computer program product, embodied in a machine-readable storage device, for defining conditions on a right applicable to a digital object, the computer program product comprising instructions operable to cause data processing apparatus to:
select a child right for the digital object and a parent right for the digital object in a hierarchy of rights including a plurality of levels, the child right being below the parent right in the hierarchy, the hierarchy of rights specifying one or more conditions on the child right and the parent right;
define a set of new conditions on the child right, the set of new conditions including one or more conditions that are defined based on one or more of the conditions on the child and parent rights using condition specific combining rules;
select one or more ancestor rights for the digital object in the hierarchy of rights, the one or more ancestor rights being above the child right and the parent right in the hierarchy, the hierarchy specifying one or more conditions on each of the one or more ancestor rights; and
for each of the one or more ancestor rights, recursively modify one or more of the conditions defined on the child right based on one or more conditions on the ancestor rights.

* * * * *